United States Patent [19]

Drouillard

[11] Patent Number: 4,550,529
[45] Date of Patent: Nov. 5, 1985

[54] WINDOW STABILIZING MECHANISM

[75] Inventor: James R. Drouillard, Rochester, Mich.

[73] Assignee: General Motors Corporation, Detroit, Mich.

[21] Appl. No.: 664,354

[22] Filed: Oct. 24, 1984

[51] Int. Cl.$^4$ .............................................. E05F 11/38
[52] U.S. Cl. ....................................... 49/348; 49/349; 49/351; 49/376
[58] Field of Search ................ 49/349, 348, 350, 351, 49/352, 353, 375, 376, 377, 227

[56] References Cited

U.S. PATENT DOCUMENTS

| | | | |
|---|---|---|---|
| 1,812,041 | 6/1931 | Esbjornson | 49/472 |
| 2,001,778 | 3/1933 | Field | 49/211 |
| 2,852,249 | 9/1958 | Hardy . | |
| 3,024,489 | 3/1962 | Peras | 49/351 X |
| 3,646,707 | 3/1972 | Lystad | 49/350 X |
| 3,868,788 | 3/1975 | Podolan | 49/349 X |
| 3,888,044 | 6/1975 | Lystad | 49/375 X |
| 4,094,100 | 6/1978 | Fukumoto et al. | 49/377 X |
| 4,241,542 | 12/1980 | Podolan et al. | 49/352 |

Primary Examiner—Philip C. Kannan
Attorney, Agent, or Firm—Charles E. Leahy

[57] ABSTRACT

Stabilizing mechanism for the rear end of a raised vehicle window includes a stabilizer track mounted in the door and including a vertical upper portion and a forward curving lower portion. A stabilizer link has a lower end carrying a roller captured in the track and an upper end pivoted to a sash bracket carried by the window. The link erects to a stand-up position extending between the track and the window when the window is raised. The link collapses to a stored position extending between the lower portion of the track and the sash bracket when the window is lowered. The link has an offset arm carrying a tapered pin which seats in a bushing carried by the door as the window reaches the fully raised position to stabilize the link to the door. The link and the sash bracket have interfitting tongue and groove elements which mate as the window reaches its fully raised position to stabilize the link to the window. A roller yieldably mounted on the window is carried into engagement with an angled wall of the door to force the window against the weather strip defining the window opening.

3 Claims, 9 Drawing Figures

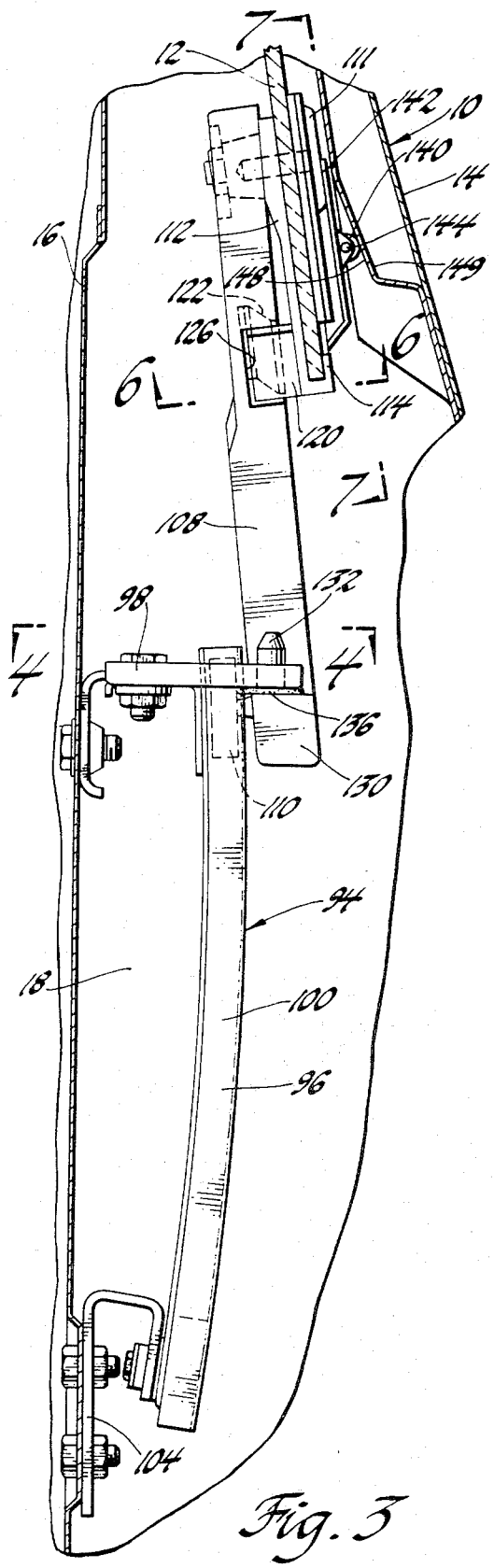
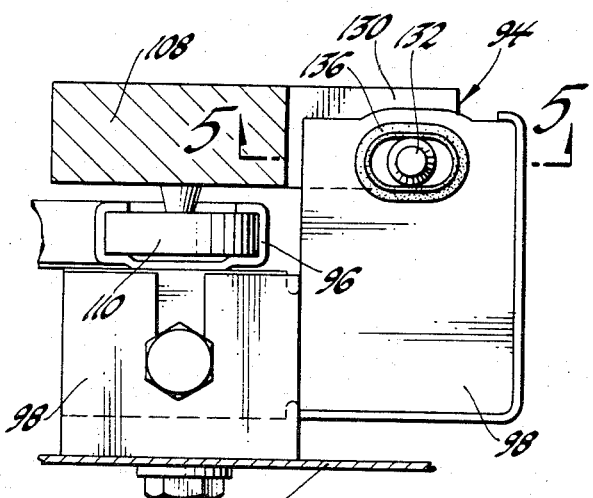
Fig. 4
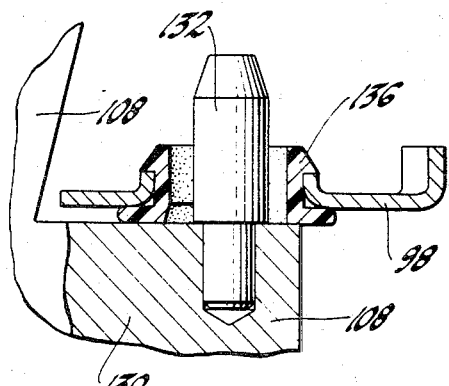
Fig. 5
Fig. 3
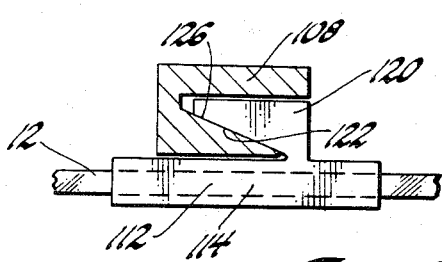
Fig. 6

U.S. Patent  Nov. 5, 1985  Sheet 3 of 3  4,550,529
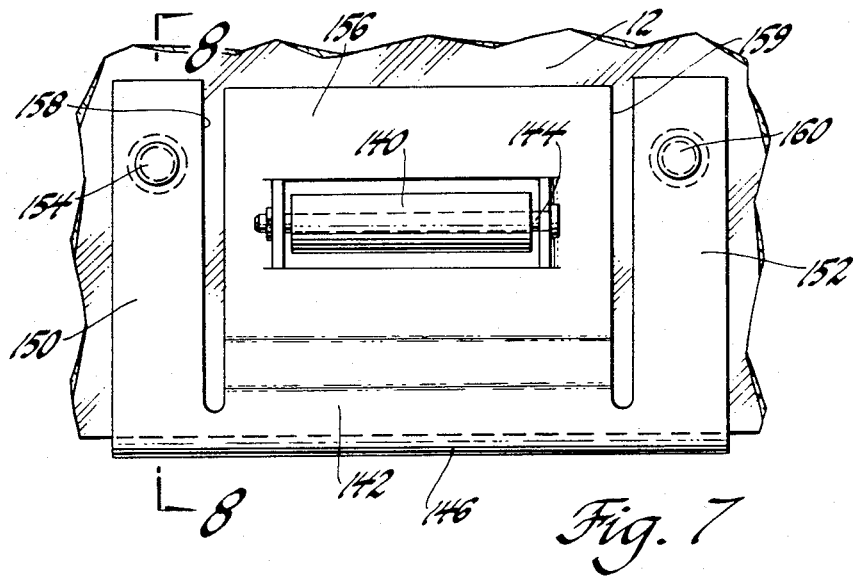
Fig. 7
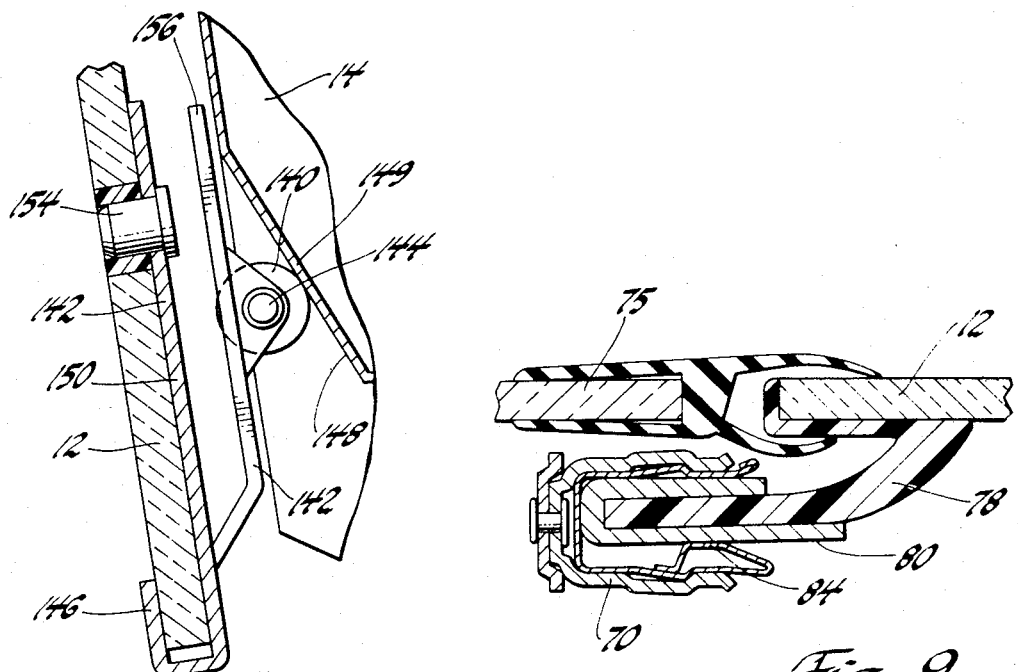
Fig. 8
Fig. 9 dow so that the stabilizer link provides a rigid interconnected stabilizing linkage between the door and the window to stabilize the lateral position of the window relative the door. The stabilizing function is supplemented by a roller which is yieldably mounted on the window and is carried into engagement with an angled wall of the door to force the window against the weather strip defining the window opening.
WINDOW STABILIZING MECHANISM The invention relates to a window stabilizing mechanism and more particularly provides a mechanism for raising and lowering a vehicle window and having a linkage for stabilizing the position of the window when in the raised position.

BACKGROUND OF THE INVENTION

It is known to provide a window regulating mechanism for moving a window between a raised position closing the window opening and a lowered position in which the window is stored in a storage cavity within the vehicle door. It is desirable to store the window as close as possible to the bottom of the storage cavity so that maximum utilization of the storage cavity may be had and accordingly the window sill structure of the door may be at its relatively lowest possible elevation.

In such vehicle window installations, particularly those which do not have a window frame surrounding the door window opening, it is desirable to stabilize the window at its raised position so that the window will be pressed firmly inwardly against sealing strips carried by the vehicle body roof rail and the B pillar to prevent leakage of water into the body.

The present invention provides a stabilizer linkage which stabilizes the position of the window in the raised position and folds and collapses as the window is stored so that the window may be lowered to a greater depth within the storage cavity.

SUMMARY OF THE INVENTION

According to the invention, a window mounted in a vehicle door is raised and lowered between open and closed positions by a conventional window regulating mechanism. A stabilizing mechanism for stabilizing the rear end of the window at the raised position includes a stabilizer track mounted within the door and including a generally vertically extending upper portion and a forwardly curving more horizontal lower portion. A stabilizer link has a lower end carrying a roller captured in the stabilizer track and an upper end pivoted to a sash bracket carried by the window. When the window is raised, the stabilizer link is erected to a stand-up position extending between the stabilizer track and the window. When the window is lowered, the stabilizer link is collapsed to a stored position extending between the lower portion of the stabilizer track and the sash bracket. The stabilizer link has an offset arm which carries a tapered pin adapted to seat within a bushing carried by a stationary bracket of the door as the window reaches the fully raised position to thereby stabilize and interconnect the stabilizer link to the door. Furthermore, the stabilizer link and the sash bracket have interfitting tongue and groove elements associated therewith which mate with one another as the window reaches its fully raised position to provide a stabilizing connection between the stabilizer link and the window. Thus, the stabilizer link is stabilized relative to the door and relative to the window so that the stabilizer link provides a rigid interconnected stabilizing linkage between the door and the window to stabilize the lateral position of the window relative the door. The stabilizing function is supplemented by a roller which is yieldably mounted on the window and is carried into engagement with an angled wall of the door to force the window against the weather strip defining the window opening.

Thus, the object, feature and advantage of the present invention resides in a folding stabilizer linkage acting between a window and a door mounted track and having associated means which interconnect the stabilizer link to the door and to the window when the window is raised so that the stabilizer link effectively stabilizes the lateral position of the window in the raised position.

A further object, feature and advantage of the invention resides in the provision of a collapsing stabilizer linkage which is operable between a collapsed position allowing the window to store adjacent the bottom of the storage cavity and an erected position in which the stabilizer linkage is effectively interconnected with both the door and the window to provide a stabilizing connection therebetween.

A further object, feature and advantage of the invention resides in the provision of a yieldably mounted roller carried by the window and cooperating with an angled wall of the door to cooperate with a stabilizer linkage erected between a track and the window to effectively stabilize the raised position of the window.

BRIEF DESCRIPTION OF THE DRAWINGS

These and other features, objects and advantages of the invention will become apparent upon consideration of the specification and the appended drawings in which:

FIG. 3 is an end elevation view of the window stabilizing mechanism taken in the direction of arrows 3—3 of FIG. 1;

FIG. 4 is a sectional view taken in the direction of arrows 4—4 of FIG. 3;

FIG. 5 is a sectional view taken in the direction of arrows 5—5 of FIG. 4;

FIG. 6 is a sectional view taken in the direction of arrows 6—6 of FIG. 3;

FIG. 7 is a fragmentary view taken in the direction of arrows 7—7 of FIG. 3;

FIG. 8 is a sectional view taken in the direction of arrows 8—8 of FIG. 7; and

FIG. 9 is a sectional view taken in the direction of arrows 9—9 of FIG. 1 and showing the glass guide at the forward end of the window.

DESCRIPTION OF THE PREFERRED EMBODIMENT

Figure 1:
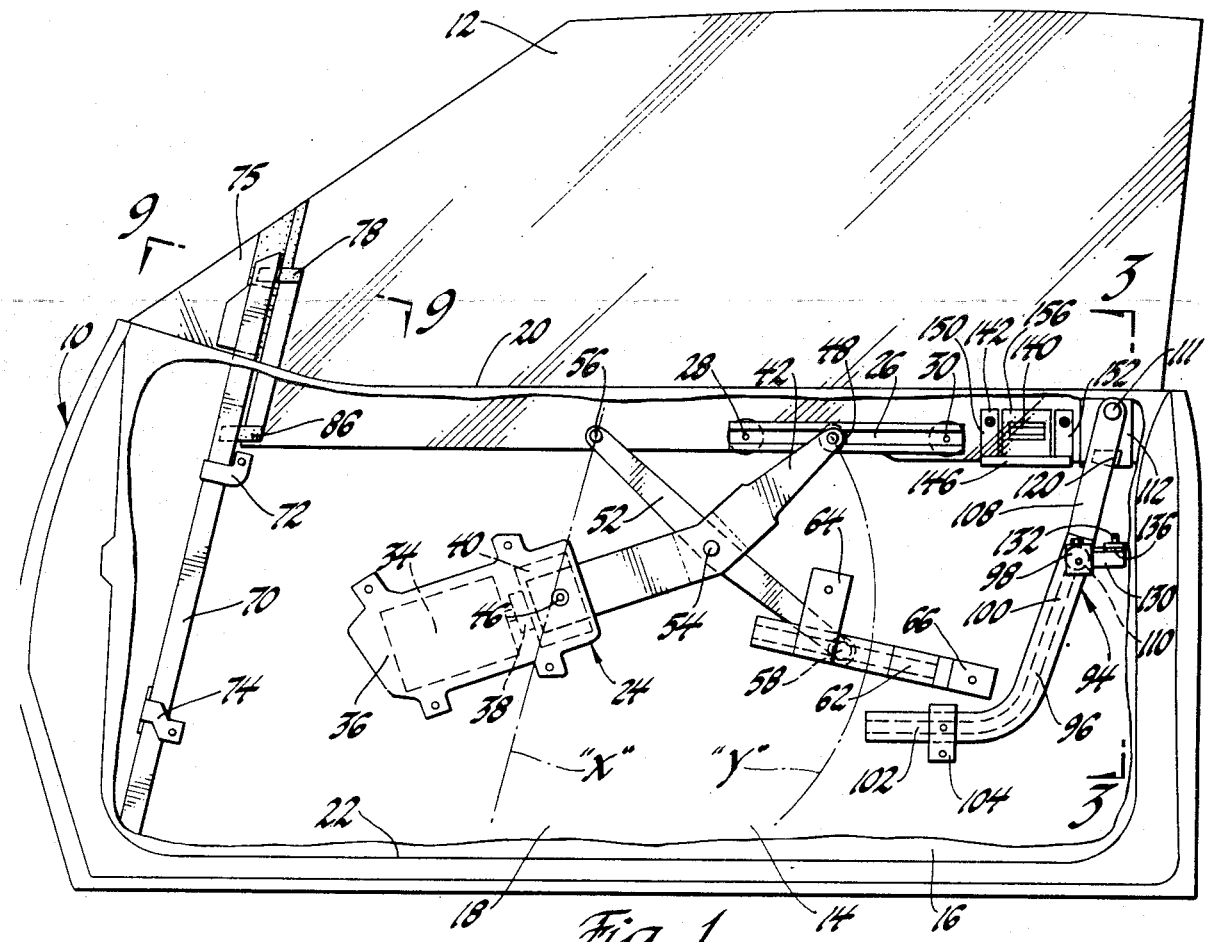
FIG. 1 is a partially broken away side elevation view of a vehicle door embodying a window stabilizing mechanism according to the invention, the window being shown in the raised position.

Referring to FIG. 1, a vehicle door 10 of a vehicle body is adapted for conventional hinging to the hinge pillar of the vehicle body for swinging movement between an open position and a closed position. When the door is in the closed position, a portion of the door opening is closed by a window 12 mounted on the door 10.

As best seen in FIGS. 1 and 3, the door 10 includes an outer panel 14 and an inner panel 16 which are spaced apart to define a storage cavity 18 in which the window 12 is stored. The height of the window 12 is only slightly less than the dimension between the sill 20 of the door 10 and the bottom wall 22 of the storage cavity 18.

Figure 2:
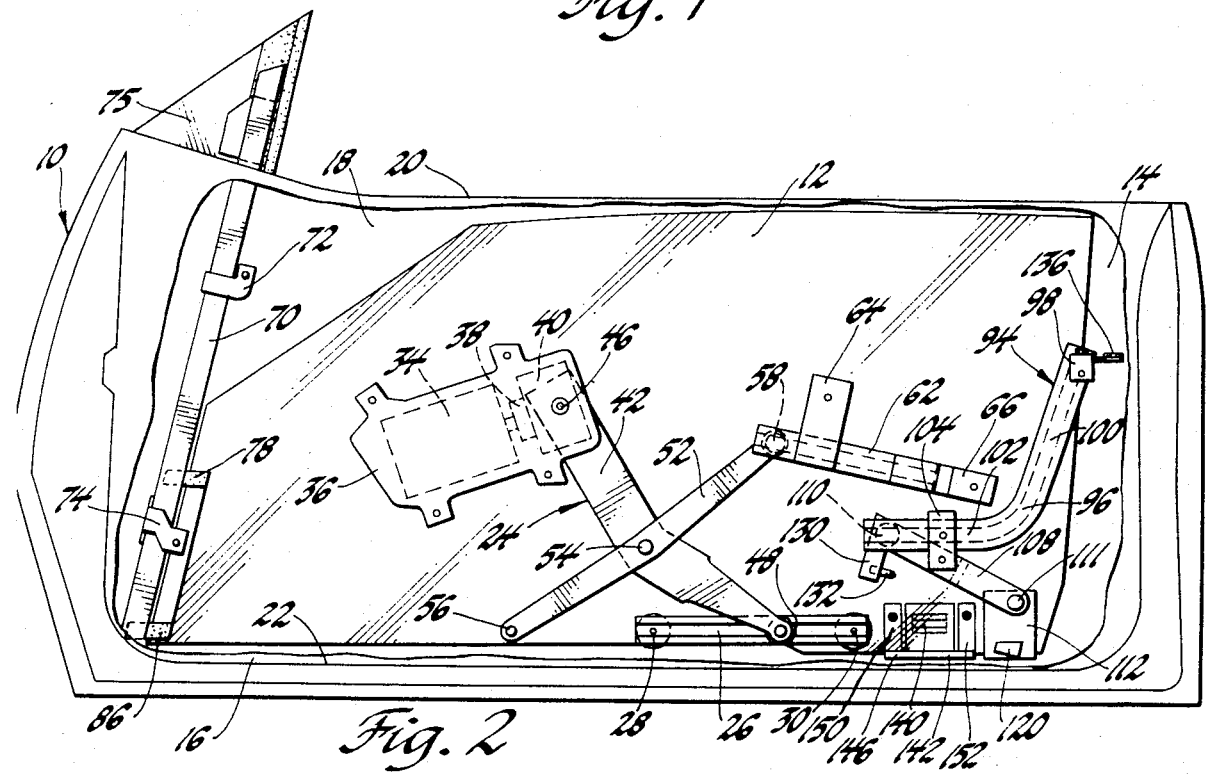
FIG. 2 is a view similar to FIG. 1 but showing the window in the lowered position.

A window regulator mechanism, generally indicated at 24, is provided for moving the window 12 between a raised closed position shown in FIG. 1 and a lowered open position shown in FIG. 2. The window regulator mechanism 24 includes a C-shaped sash channel 26 which is mounted along the lower edge of the window 12 by bolts 28 and 30. A motor 34 is mounted on a mounting bracket 36 attached to door inner panel 16 and has a pinion gear 38 which meshes with a gear sector 40 of a regulator arm 42. The regulator arm 42 is mounted on the mounting bracket 36 by a pivot 46. A roller 48 is pivotally mounted on the end of the regulator arm 42 and rides in the sash channel 26.

The window regulator mechanism 24 also includes a guide arm 52 which is mounted on the regulator arm 42 by pivot 54. One end of the guide arm 52 is fixedly attached to the window 12 by bolt 56. The other end of the guide arm 52 carries a roller 58 which rides in a guide channel 62 mounted on the door inner panel 16 by brackets 64 and 66.

The window is lowered from the raised position of FIG. 1 by energizing the electric motor 34 to pivot the regulator arm 42 downwardly. The roller 48 carried on the end of the regulator arm 42 descends along the arguate path "Y" and lowers the rear end of the window 12. Concomitantly, the guide arm 52 carried on the regulator arm 42 by pivot 54 moves downwardly with its one end carrying roller 58 guided in the guide channel 62 so that the other end fixedly attached to window 12 by bolt 56 descends along the straight line designated "X" to support and control the downward movement of the front end of the window 12.

As best seen in FIGS. 1, 2 and 9, the front end of the window 12 is supported and guided by a channel 70 which extends from the bottom wall 22 of the storage cavity 18 to a height above the door sill 20. The channel 70 is mounted upon the door inner panel 16 by mounting brackets 72 and 74. A triangular patch 75 of window glass is fixedly mounted on the door adjacent to upper end of the channel 70. As best seen in FIG. 9, a plastic upper foot 78 is bonded to the upper leading edge of the window 12 and extends into the channel 70. A U-shaped shoe 80 is fixedly mounted on the upper foot 78 and slides in a retainer clip 84 seated within the channel 70. A similar lower foot 86 is attached to the lower front corner of the window 12 and also slides in the channel 70.

As the window 12 moves between the raised position of FIG. 1 and the lowered position of FIG. 2, the upper foot 78 and lower foot 86 slide within the channel 70 to establish the lateral location of the forward end of the window 12.

A stabilizing mechanism, generally indicated at 94, is provided to stabilize the lateral position of the rear end of the window 12. As best seen in FIGS. 1 and 3, the stabilizing mechanism 94 includes a curved stabilizer track 96 which is shaped like a boomerang and has a generally vertical extending upper portion 100 mounted on the door inner panel by a mounting bracket 98 and a forwardly extending more horizontal portion 102 mounted on the door inner panel 16 by a mounting bracket 104. A stabilizer link 108 carries a roller 110 at one end thereof which rides in the stabilizer track 96. The other end of the stabilizer link 108 is pivotally connected to the window 12 by a pivot bolt 111 and a sash bracket 112 as best seen in FIG. 3. The sash bracket 112 includes an upturned flange 114 at its bottom edge which receives the bottom edge of the window 12.

As best seen in FIGS. 2, 3 and 6, the sash bracket 112 carries a tapered tongue 120 which defines a forwardly opening tapered groove 122. The stabilizer link 108 is recessed to define a tapered receptacle 126 for receiving the tongue 120 of stabilizer link 108. These tongues and grooves of the sash bracket 112 and stabilizer link 108 engage with one another to stabilize the window as will be discussed further hereinafter.

As best seen in FIGS. 2, 3, 4 and 5, the stabilizer link 108 includes a rearwardly offset leg 130 which carries an upstanding tapered pin 132. The pin 132 is adapted to be received within a bushing 136 carried in the mounting bracket 98 as will be discussed further hereinafter.

As best seen in FIGS. 1, 3, 7 and 8, the stabilizer mechanism 94 also includes a roller 140 which is rotatably mounted upon a sash bracket 142. Sash bracket 142 has an upturned flange 146 which grips the bottom edge of the window 12. Sash bracket 142 also includes a pair of spaced apart legs 150 and 152 respectively attached to the glass by rivets 154 and 160. A pin 144 mounts the roller 140 on a central portion 156 of the sash bracket 142 which is separated from the legs 150 and 152 by slots 158 and 159. As best seen in FIG. 8, the central portion 156 is bent inwardly from the legs 150 and 152 and from the window 12 to permit a yielding movement of the central portion 156 and roller 140 thereon when the roller 140 bears against the angled wall 148 of reinforcement panel 149 as the window 12 reaches the fully closed position of FIG. 1.

OPERATION

The window 12 is moved from the open position of FIG. 2 to the closed position of FIG. 1 by energizing the motor 34 of the window regulator 24. The regulator arm 42 is thus raised and the guide arm 52 cooperates therewith to raise the window 12 therewith as described hereinbefore.

The sash bracket 112 is raised with the window 12 and simultaneously raises the stabilizer link 108 from its collapsed position of FIG. 2 to the erect position of FIG. 1. As the window reaches its fully closed position of FIG. 1, the stabilizer link 108 completes its pivotal movement relative to the stabilizer track 96 and the tapered stabilizer pin 132 mounted on the offset leg 130 of the stabilizer link 108 seats within the bushing 136 mounted on the stationary mounting bracket 98 as shown in FIGS. 3, 4 and 5. This interfit of the pin 132 within the bushing 136 stabilizes the stabilizer link 108 laterally relative to the door 10 via the mounting bracket 98 attached to the door. Simultaneously, as best seen in FIGS. 3 and 6, the tapered tongue 120 of the sash bracket 112 seats within the tapered receptacle groove 126 of stabilizer link 108. This tongue and groove interfit between the stabilizer link 108 and the sash bracket 112 stabilizes the lateral location of the stabilizer link 108 relative to the window 12. Thus, the stabilizer link 108 is effectively interconnected with both the door and the window to effectively stabilize the lateral location of the window 12 in the raised position of FIG. 1.

Furthermore, as the window 12 reaches the fully raised position, the roller 140 carried by the sash bracket 142 engages against the angled wall 148 of the reinforcement panel 149 of the door. The central portion 156 of the sash bracket 142 yields somewhat relative to the angled wall 148 to maintain a constant pressure on the window 12 which stabilizes the glass and forces the window laterally of the body to engage with a weatherstrip surrounding the door opening.

The window 12 is lowered from its raised position of FIG. 1 to the stored position of FIG. 2 by energizing the motor 34 to lower the regulator arm 42. The resulting downward motion of the window 12 carries the roller 140 away from engagement with the angled wall 148 of the reinforcement panel 149. Simultaneously the stabilizer link 108 is lowered with the glass to carry the pin 132 out of the bushing 136. As the stabilizer link progresses downwardly the lower end thereof carrying the roller 110 travels downwardly and forwardly along the stabilizer track 96 to disengage the receptacle 126 of stabilizer link 108 from the tongue 120 of sash bracket 112. When the window 12 reaches the fully lowered position of FIG. 2, the stabilizer link 108 reaches its fully collapsed position shown in FIG. 2.

Thus it is seen that the invention provides a new and improved stabilizer mechanism for a vehicle window. The stabilizer linkage stabilizes the lateral position of the glass in the door. The stabilizer linkage folds so that the window is permitted to be lowered all the way to the bottom wall of the door defining the storage cavity so that maximum utilization of the storage cavity may be had and accordingly the window sill structure may be at a relatively low elevation.

The embodiments of the invention in which an exclusive property or privilege is claimed are defined as follows:

1. In a vehicle body door having a window opening and a window storage cavity beneath the window opening, a window movable between a raised position closing the opening and a lowered position stored in the storage cavity, and window regulator means connected to the window for moving the window along a defined path of movement between the raised and lowered positions, a stabilizer mechanism comprising:
   a guide track mounted on the body within the storage cavity said track being curved to define a generally vertical upper portion and a more horizontal lower portion;
   link means having one end associated with the track and movable therealong in a manner to enable pivotal movement of the link means with respect to the track and an other end pivotally connected to the window so that the movement of the window to the closed position causes the link means to stand up between the upper portion of the track and the window to stabilize the window and movement of the window to the lowered position causes the link means to assume a laying down position; and
   interconnecting means provided respectively between the link means and the door and between the link means and the window and adapted to automatically interconnect therebetween when the window reaches the closed position causing the link to stand up whereby the link substantially stabilizes the closed position of the window.

2. In a vehicle body door having a window opening and a window storage cavity beneath the window opening, a window movable between a raised position closing the opening and a lowered position stored in the storage cavity, and window regulator means connected to the window for moving the window along a defined path of movement between the raised and lowered positions, a stabilizing mechanism comprising:
   a guide track mounted on the door within the storage cavity;
   a stabilizer link having one end mounted on the track for movement therealong and an other end pivotally connected to the window, said track guiding movement of said stabilizer link between a collapsed position when the window is lowered and an erected position when the window is raised;
   tongue and groove means acting between the stabilizer link and the window to stabilize the lateral relationship between the stabilizer link and the window when the window is in the raised position; and
   interfitting tapered pin and bushing elements carried respectively by the stabilizer link and the door for stabilizing the lateral relative locations between the stabilizer link and the door when the window is in the raised position.

3. In a vehicle body door having a window opening and a window storage cavity beneath the window opening, a window movable between a raised position closing the opening and a lowered position stored in the storage cavity, and window regulator means connected to the window for moving the window along a defined path of movement between the raised and lowered positions, a stabilizer mechanism comprising:
   a guide track mounted on the body within the storage cavity said track being curved to define a generally vertical upper portion and a more horizontal lower portion;
   link means having one end associated with the track and movable therealong in a manner to enable pivotal movement of the link means with respect to the track and an other end pivotally connected to the window so that the movement of the window to the closed position causes the link means to stand up between the upper portion of the track and the window to stabilize the window and movement of the window to the lowered position causes the link means to assume a laying down position;
   interconnecting means provided respectively between the link means and the door and between the link means and the window and adapted to automatically interconnect therebetween when the window reaches the closed position causing the link to stand up whereby the link substantially stabilizes the closed position of the window; and
   roller means and angled wall means provided respectively on the window and the door to engage with one another when the window reaches the closed position to thereby supplement the stabilization provided by the stabilizer link.

* * * * *